United States Patent [19]

Donley

[11] 4,204,028
[45] May 20, 1980

[54] CONDUCTIVE METAL OXIDE FILM FOR SOLAR ENERGY CONTROL

[75] Inventor: Harold E. Donley, Oakmont, Pa.

[73] Assignee: PPG Industries, Inc., Pittsburgh, Pa.

[21] Appl. No.: 887,384

[22] Filed: Mar. 16, 1978

[51] Int. Cl.$^2$ .................................................. B32B 17/06
[52] U.S. Cl. .................................. 428/432; 428/913; 428/539; 427/108; 427/165; 106/287.19; 106/1.27; 260/429 J
[58] Field of Search .................. 428/432, 913, 539; 427/165, 108; 260/429 J

[56] References Cited

U.S. PATENT DOCUMENTS

| Re. 25,767 | 4/1965 | Auffenorde et al. | 428/432 X |
|---|---|---|---|
| 2,617,741 | 11/1952 | Lytle | 117/54 |
| 2,688,565 | 9/1954 | Raymond | 117/35 |
| 2,754,221 | 7/1956 | Caroselli | 117/46 |
| 2,975,076 | 3/1961 | Saunders et al. | 117/124 |
| 3,004,875 | 10/1961 | Lytle | 117/211 |
| 3,185,586 | 5/1965 | Saunders | 117/54 |
| 3,645,778 | 2/1972 | Nesteruk | 117/93.4 |
| 3,660,061 | 5/1972 | Donley et al. | 65/32 |
| 3,754,975 | 8/1973 | Spiller | 106/1 |
| 3,850,665 | 11/1974 | Plumat | 428/432 |

OTHER PUBLICATIONS

R. F. Bush, Abrasion Resist. Reflective Coat., Aug., 1972, IBM Technical Discl. Bull., vol. 15, No. 3.

Primary Examiner—P. C. Ives
Attorney, Agent, or Firm—Donna L. Seidel

[57] ABSTRACT

An electroconductive film comprising the oxides of cobalt and nickel in a spinel structure having the formula $NiCo_2O_4$ and having high absorption in the luminous and infrared portions of the solar energy spectrum is disclosed.

4 Claims, No Drawings

CONDUCTIVE METAL OXIDE FILM FOR SOLAR ENERGY CONTROL

BACKGROUND OF THE INVENTION

Metal oxide films for solar energy control are known. U.S. Pat. No. 3,185,586 to Saunders et al discloses coating glass sheets by applying a suitable organic metal compound in a suitable organic vehicle onto a heated glass surface. Particular films comprising the oxides of cobalt, nickel and tin or iron are preferred. Such films typically have an infinite resistivity (greater than $10^6$ ohms per square).

In U.S. Pat. No. 3,850,665, Plumat et al, disclose a metal oxide coating formed on a substrate by applying a composition comprising an acetyl acetonate coprecipitate of two or more metals. The coating is a mixed metal oxide in which the elements are in stoichiometric proportions forming a true molecule of definite composition.

SUMMARY OF THE PRESENT INVENTION

The present invention relates to the formation of an electroconductive mixed metal oxide coating of definite composition comprising nickel and cobalt in an oxide matrix. The nickel cobaltite coating has a high absorption of light in the luminous and infrared portions of the solar energy spectrum and a resistivity in the range of 900 to 6000 ohms The method for forming a nickel cobaltite coating involves preparing a coating composition comprising an organic nickel compound and an organic cobalt compound in such amounts that the coating composition comprises nickel and cobalt in the proportions of about 50 to 5 percent by weight nickel and about 50 to 95 percent by weight cobalt. In compositions wherein the nickel/cobalt ratio deviates from the stoichiometric 1:2, the coating will comprise the oxide of the metal present in excess in addition to the nickel cobaltite. The coating composition is applied to a substrate under conditions which result in thermal decomposition of the organic metal compounds to form the metal oxide coating.

DESCRIPTION OF THE PREFERRED EMBODIMENTS

The method of the present invention may be used to coat individual articles, metallic or nonmetallic, such as glass sheets. However, it is preferably practiced in relation to a float glass operation. A continuous ribbon of glass is typically formed on the surface of a bath of molten tin in a reducing atmosphere of nitrogen and hydrogen. After the glass has achieved a dimensionally stable physical state but while it is still hot enough to cause thermal decomposition of organometallic coating reactants, the upper surface is contacted with the coating composition of the present invention, outside the reducing atmosphere wherein the glass was formed.

Coating compositions useful according to the present invention comprise an organic nickel compound and an organic cobalt compound in such proportion that the resultant mixed metal oxide film is electroconductive and comprises, as determined by electron diffraction analysis, nickel cobaltite ($NiCo_2O_4$). The ratio of nickel to cobalt in the coating composition may range from about 1:1 to 1:20 parts by weight but is preferably from about 1:2 to 1:4. Organic metal compounds suitable for use according to the present invention include those which thermally decompose to form oxides at temperatures below the temperature at which the substrate to be coated becomes dimensionally or chemically unstable. Known organo-metallic coating reactants such as the acetates, naphthanates, 2-ethyl hexoates and neodecanoates are suitable; however, the acetyl acetonates are preferred. It is not necessary to coprecipitate the nickel and cobalt coating reactants; a simple mixture or solution is preferred.

The nickel acetyl acetonate and cobalt acetyl acetonate are preferably used in about a 1:2 proportion, resulting in a ratio of about 35:65 nickel to cobalt in the coating. The mixture of the coating reactants may be applied by chemical vapor deposition. Preferably, however, the coating reactants are dissolved in an organic solvent and sprayed onto a glass substrate with a surface temperature of at least about 500° F. (about 260° C.), typically about 1100° F. (about 593° C.). The coating solution preferably contains about 2 percent by weight metal.

Suitable solvents include both polar solvents such as alcohols and nonpolar solvents such as benzene, toluene or xylene. However, halocarbons and halogenated hydrocarbons are preferred for their lower volatility and flammability. Preferred halogenated solvents include methylene chloride, methylene bromide, carbon tetrachloride, chloroform, bromoform, trichloroethanes, perchloroethylene, trichloroethylene, tribromoethylene, dichloroiodomethane, trichlorofluoromethane, hexachloroethane, trichlorodifluoroethanes, tetrachlorofluoroethanes, hexachlorobutadiene, tetrachloroethane and similar compounds. In addition, mixtures of suitable solvents may be used to combine desirable properties. A preferred solvent combination is methylene chloride and trichloroethylene.

The coating solution is preferably sprayed onto the hot glass surface at a rapid rate from a plurality of spray guns at a spacing preferably less than a foot from the glass surface. A detailed description of a preferred method and apparatus for applying the coating composition according to the present invention is described in U.S. Pat. No. 3,660,061 to Donley et al which description is incorporated herein by reference.

The resultant metal oxide film is electroconductive (herein meaning a surface resistivity less than $10^4$ ohms per square) and comprises nickel cobaltite.

The present invention will be further understood by descriptions of specific examples which follow.

EXAMPLE I

A clear sheet of ¼ inch (6 millimeter) thick soda-lime-silica glass is maintained at a temperature of about 1100° F. (about 593° C.). A solution comprising nickel acetyl acetonate and cobalt acetyl acetonate in a solvent comprising 40 percent by volume methylene chloride, 40 percent by volume trichloroethylene, and 20 percent methanol is sprayed onto the hot glass surface. This coating solution is approximately 2 percent by weight metal which is 30 percent nickel and 70 percent cobalt. A mixed metal oxide film is deposited on the glass surface at a sufficient thickness to result in a luminous transmittance of 27 percent for the coated sheet. The surface resistivity of the coated sheet is 5140 ohms per square.

EXAMPLES II to X

Glass sheets are coated as in Example I except for variations in the nickel/cobalt ratio. Luminous transmittances and surface resistivities for the samples of Examples II to X are compared in Table I.

TABLE I

Luminous Transmittances and Surface Resistivities for Nickel Cobaltite Films

| Example | Ni:Co | Luminous Transmittance (%) | Surface Resistivity (Ohms/Square) |
|---|---|---|---|
| II | 23:77 | 23 | 3700 |
| III | 25:75 | 26 | 3890 |
| IV | 27:73 | 24 | 3250 |
| V | 29:71 | 24 | 2650 |
| VI | 31:69 | 24 | 1630 |
| VII | 33:67 | 24 | 1580 |
| VIII | 35:65 | 23 | 950 |
| IX | 37:63 | 26 | 5820 |
| X | 40:60 | 24 | 2110 |

EXAMPLE XI

A coating solution is sprayed as in Example VIII onto the surfaces of gray and bronze tinted glass substrates. The surface resistivities are 1840 ohms per square on the gray sample and 1620 ohms per square on the bronze sample. The films are subsequently stripped from the glass using hydrofluoric acid. Electron diffraction analysis of the films produces the same pattern for both films, identifying the composition as $NiCo_2O_4$.

EXAMPLE XII

Clear glass blocks having outside dimensions of 12×12×4 inches (about 0.3×0.3×0.1 meters) and an interior air space of 3¼ inches (about 80 millimeters) are sprayed on an outside surface at a temperature of about 1300° F. (about 700° C.) with a coating solution comprising nickel neodecanoate and cobalt neodecanoate dissolved in mineral spirits (boiling range 160°–210° C.). The solution contains 6 percent by weight metal which is 40 percent nickel and 60 percent cobalt. The resultant luminous transmittances are about 25 percent and the surfaces resistivities are in the range of 4000–6000 ohms per square.

EXAMPLE XIII

A continuous ribbon of bronze tinted float glass at a temperature of about 1065° F. (about 570° C.) is sprayed with a solution of nickel acetyl acetonate and cobalt acetyl acetonate in a solvent comprising 37.5 percent by volume methylene chloride, 37.5 percent by volume trichloroethylene and 25 percent by volume methanol. The solution contains 2 percent by weight metal which is 35 percent nickel and 65 percent cobalt. The luminous transmittance of the nickel cobaltite coated glass is 23 percent, the luminous reflectance is 34 percent and the surface resistivity is 4500 ohms per square.

EXAMPLE XIV

A sheet of gray tinted float glass at a temperature of about 1100° F. (about 593° C.) is sprayed with a solution similar to that of Example XIII except that the ratio of nickel to cobalt is 25 to 75 percent. The luminous transmittance of the coated glass is 11 percent, the luminous reflectance is 32 percent and the surface resistivity is 5000 ohms per square.

The above examples are offered to illustrate the present invention, the scope of which is limited only by the following claims.

I claim:
1. An electroconductive article comprising:
   a. a glass substrate; and
   b. an electroconductive metal oxide coating wherein the metal portion consists essentially of
      (1) about 5 to 50 percent nickel; and
      (2) about 50 to 95 percent cobalt
   wherein the surface resistivity of the coated surface is less than $10^4$ ohms per square.
2. An article according to claim 1, wherein the metal oxide coating comprises the thermal decomposition products of organic metal compounds selected from the group consisting of the neodecanoates and acetyl acetonates of nickel and cobalt.
3. An article according to claim 2, wherein the luminuous transmittance is about 20 to 30 percent on a clear glass substrate.
4. An article according to claim 2, wherein the metal oxide coating displays the electron diffraction pattern of nickel cobaltite.

* * * * *